United States Patent Office 3,505,208
Patented Apr. 7, 1970

3,505,208
HYDROCRACKING PROCESS
Raoul P. Vaell, Los Angeles, Calif., assignor to Union Oil Company of California, Los Angeles, Calif., a corporation of California
Filed Dec. 26, 1967, Ser. No. 693,417
Int. Cl. C10g 13/10
U.S. Cl. 208—111        10 Claims

ABSTRACT OF THE DISCLOSURE

Mineral oil feedstocks which are substantially free of organic nitrogen, but which contain dissolved benzcoronenes, are subjected to catalytic hydrocracking over crystalline zeolite type catalysts while maintaining a sufficient recycle of unconverted oil to bring about, under normal conditions, a substantial buildup and eventual precipitation of benzcoronenes in the cooler parts of the system such as heat-exchange surfaces. According to the invention, this build-up and precipitation is prevented by maintaining sufficient added ammonia in the hydrocracking zone to bring about an increased rate of conversion of the benzcoronenes to other more soluble compounds which do not precipitate out in the system.

BACKGROUND AND SUMMARY OF THE INVENTION

The catalytic hydrocracking of mineral oil feedstocks to produce lower boiling hydrocarbons, using Group VIII metal-promoted crystalline zeolite catalysts at relatively low temperatures of about 500–700° F., has in recent years become an established commercial process. This process offers substantial advantages over older hydrocracking processes in respect to catalyst life, liquid yields, reduced dry gas make, and lower operating temperatures and pressures. A difficulty has recently been encountered however in respect to the use of such zeolite catalysts for hydrocracking feedstocks containing dissolved benzcoronenes, and where a substantially total recycle of the heavy bottoms fraction of the unconverted oil is maintained. It will be understood that these benzcoronene contaminants are not native constituents of crude oils, or any of the virgin distillates therefrom. Neither are they found in detectable quantities in the unconverted oils from conventional catalytic cracking, coking, thermal cracking, or the like. They are soluble in hydrocarbon oils only to the extent of a few parts per million, up to perhaps about 100 parts per million of the more soluble species. The presently available evidence indicates that these benzcoronenes find their way into refinery streams via synthesis in high-temperature hydroconversions such as reforming, or catalytic hydrofining at temperatures above about 700° F. As is well known, hydrocracking feedstocks are often subjected to catalytic hydrofining to reduce the sulfur and nitrogen levels to values which do not bring about undue deactivation rates of the hydrocracking catalyst. It is in respect to feedstocks which have been prehydrofined at relatively high temperatures that problems in respect to benzcoronenes have recently been encountered in zeolite hydrocracking processes.

The main problem is not, as might have been supposed, the tendency of these benzcoronenes to cause coking and deactivation of the catalyst; the relatively low temperatures and high hydrogen pressures employed tend to prevent further polymerization and/or condensation reactions of such compounds to form coke. Instead, the principal problem which has evolved is peculiar to those processes wherein substantially all of the heavy unconverted recycle oil bottoms fraction is continuously recycled in the process. The small pore structure of the zeolite catalysts is apparently such that these benzcoronenes are not hydrogenated at a rate sufficient to prevent their buildup in the recycle system. Due to their relative insolubility in the oil, when the concentration of such compounds builds up to a level of about 50–100 parts per million, they begin to "plate out" in cooler portions of the system, particularly heat exchange surfaces, transfer lines, valves and the like, resulting in plugging problems and reduced heat exchange efficiency. Conventionally, this problem is solved by bleeding a portion of the recycle oil from the system and diverting it to other uses, but this is undesirable from several standpoints, including reduced yields of more valuable products such as gasoline.

It has now been discovered however that total recycle of unconverted oil can be maintained indefinitely, resulting in 100% conversion to gasoline if desired, without encountering the above noted precipitation problems by simply adding sufficient ammoniacal nitrogen to the system to maintain a small amount of ammonia in the reaction zone. For reasons which are not clearly understood, it appears that the ammonia brings about an increased rate of hydrogenation and/or conversion of the benzcoronenes to other compounds which are more soluble in the liquid product. One hypothesis is that the benzcoronenes, being highly basic compounds, are initially strongly adsorbed and hydrogenated on the catalyst surface, but are very difficulty desorbed in the absence of a more basic displacing compound such as ammonia. Another hypothesis is that the ammonia in some way increases the actual hydrogenation rate of the benzcoronenes, whereby they are then more readily cracked to lower molecular weight compounds. It is not intended however that the invention be limited to any of these theories; the observed results simply are that upon adding ammonia to the reaction zone, there is a substantially immediate decrease in the benzcoronene concentration of the effluent, and precipitation problems cease.

DESCRIPTION OF FEEDSTOCKS

Figure 1:
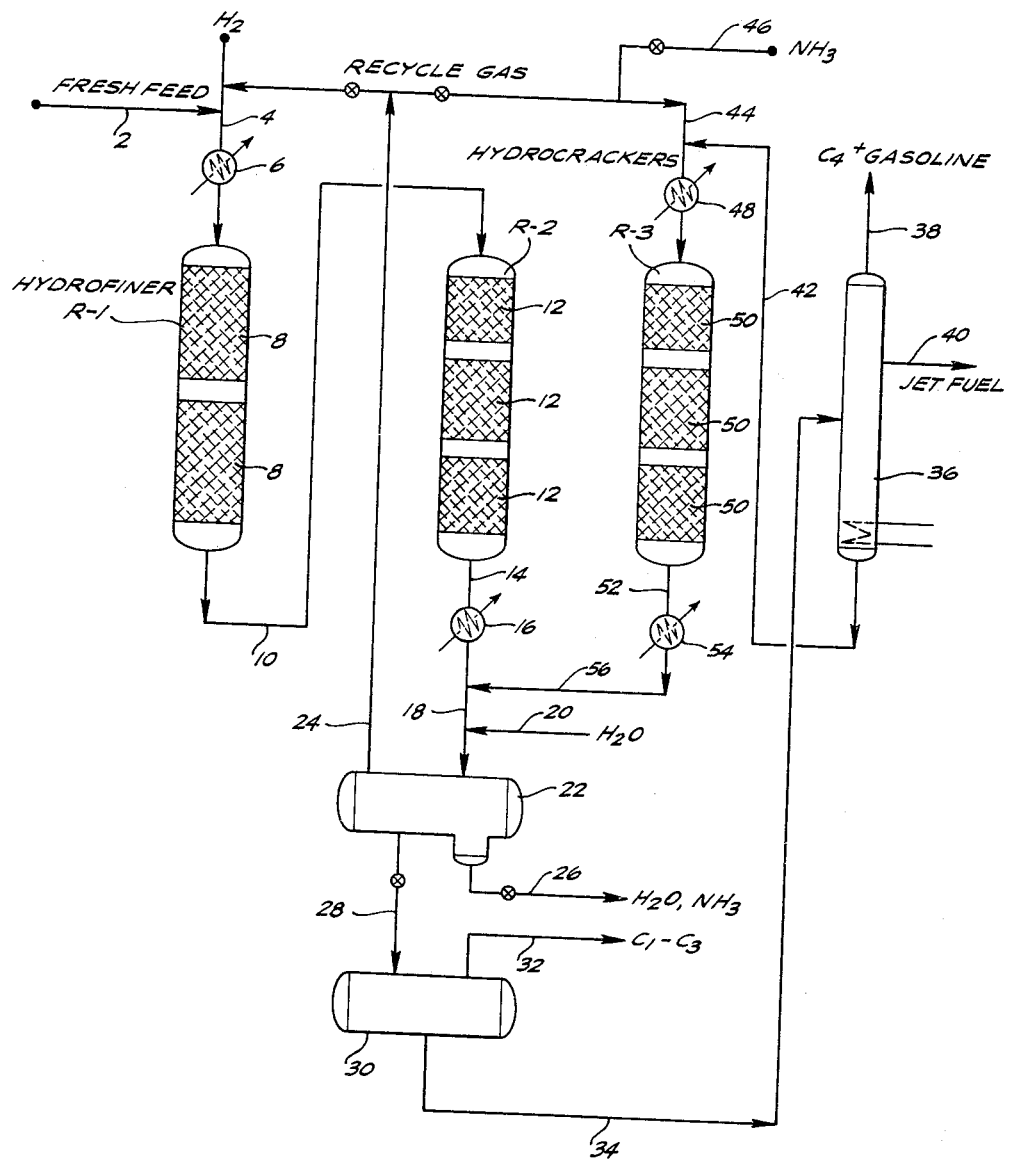
FIGURE 1 is a schematic flow diagram illustrating an application of the invention to a specific process arrangement to be described hereinafter.

Broadly speaking, any mineral oil feedstock may be employed herein which contains benzcoronenes in amounts sufficient to result in a buildup thereof to levels above their solubility limits in a recycle hydrocracking process utilizing the crystalline zeolite catalyst to be described hereinafter. In some cases, amounts as low as one weight-part-per-million may be sufficient to result in such undesirable buildup, although in general amounts greater than about 5 parts per million are required. It is noteworthy that coronene itself, either because of greater solubility and/or greater ease of conversion by the zeolite catalyst, does not appear to be troublesome. The troublesome benzcoronenes are defined herein as any fused-ring polycyclic aromatic hydrocarbon containing a coronene nucleus and fused thereto at least one additional benzo-ring. Examples of such compounds which have been found in solid deposits removed from heat exchanges used for condensing effluent from zeolite catalyst reactors are as follows:

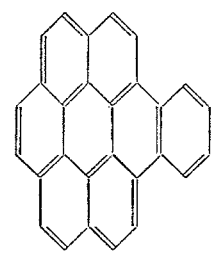

(−42Z)
Benzcoronenes

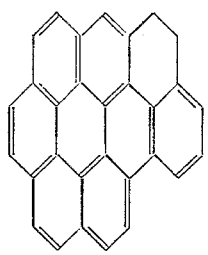

(−44Z)
Naphbenzcoronenes

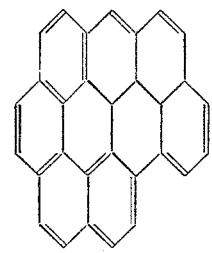

(−46Z)
Dibenzcoronenes

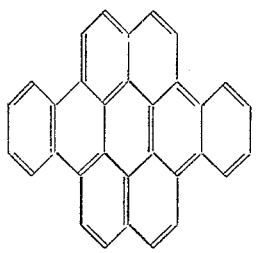

(−48Z)
Dibenzcoronenes

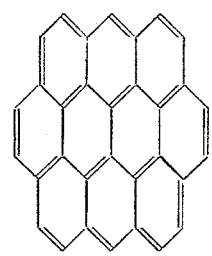

(−50Z)
Ovalenes

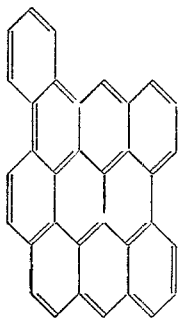

(−52Z)
Tribenzoronenes

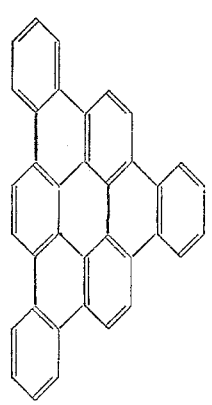

(−54Z)
Trebenzcoronenes

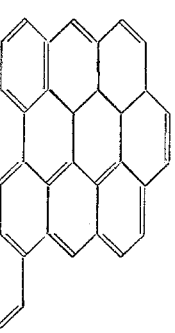

(−56Z)
Benzovalenes

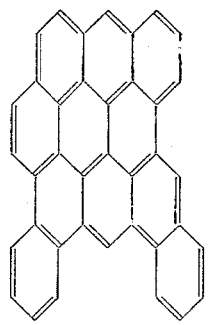

(−58Z)
Tetrabenzcoronenes

It will be apparent that in many instances, the above structural formulae represent merely one isomer of the given generic name. The Z factors noted refer to the hydrogen deficiency of the respective hydrocarbons, from the general formula, $C_nH_{2n+z}$.

Although the above compounds are very high boiling materials it is not to be assumed that they are found only in mineral oils of similarly high end-boiling-points (as determined by conventional ASTM methods). Since the limit of solubility of these compounds ranges between about 10 and 100 parts per million, their presence in mineral oils has little or no effect upon end-boiling-points thereof as determined by conventional methods. Hence, it may be found that feedstocks with end-boiling-points as low as about 500° F. may contain troublesome amounts of benzcoronenes. The critical characteristics of feedstocks to which the present invention may be advantageously applied are (1) that they contain benzcoronenes in the troublesome amounts cited, and (2) that they be substantially free of organic nitrogen compounds. When organic nitrogen compounds are present, they will be decomposed during the hydrocracking process to form ammonia which will then inherently accelerate the destruction of benzcoronenes. The present invention is therefore limited to feedstocks which contain insufficient organic nitrogen to yield the desired ammonia concentration, ordinarily at least about 20 weight parts per million.

As noted above, benzcoronenes are generally found only in hydrocarbon fractions which have previously been subjected to high-temperature hydrocatalytic conversions such as catalytic reforming or catalytic hydrofining. Products from these refining processes hence normally constitute the primary feedstocks to which the present invention is applicable. Typical feedstocks comprise hydrofined gas oils boiling between about 400° and 1000° F., heavy naphtha reformate polymer fractions boiling between about 400° and 550° F., and the like. Obviously, blends of such fractions with other low nitrogen virgin and/or cracked distillates may also be utilized.

PROCESS DESCRIPTION

In broad aspect, the present invention simply involves adding ammonia or an ammonia precursor to the feed as above defined, and/or to the recycle hydrogen stream to a hydrocracking unit containing a zeolite catalyst as hereinafter described; cooling and condensing the resulting product, fractionating it to recover the desired low-boiling product, e.g. gasoline and/or jet fuel, and finally recycling sufficient unconverted oil to bring about, under normal conditions, a buildup of benzcoronenes to levels exceeding their solubility in the liquid product condensate. Thus, the invention is not limited to a total recycle of unconverted oil, although one of the most advantageous aspects of the invention is that it does permit total recycle.

The amount of ammonia added may vary widely. In some instances, as little as 10–20 weight-parts-per-million based on feed may be sufficient to achieve a dramatic reduction in benzcoronenes. In most instances however it is preferred to employ amounts ranging between about 50 and 200 p.p.m. Amounts in excess of 200 p.p.m. can also be employed, ranging up to about 2000 p.p.m. In general however, large amounts in excess of about 200 p.p.m. are undesirable in that it is then necessary to substantially increase reactor temperatures in order to maintain the desired conversion level. Ammonia in amounts below about 200 p.p.m. is in general sufficient to achieve the desired purposes with only moderate temperature increases of e.g. 20° to 100° F. Moderate temperature increases in this range have substantially no adverse effect upon catalyst life or product distribution, as may be the case where greater temperature increases are required. These higher temperatures may however be beneficial in one respect, namely in raising the aromaticity and octane level of the heavy naphtha produced, but this is not always desirable overall because there may be concomitant decreases in yield and light $C_5-C_6$ gasoline octane values.

The beneficial effect of the added ammonia herein cannot be attributed merely to increased reactor temperatures resulting therefrom. It has been observed that as a hydrocracking run progresses over a period of several weeks, necessitating incremental temperature increases to maintain conversion, the increased temperatures do not eliminate the need for added ammonia; in fact, benzcoronene levels tend to rise even more toward the end of such runs, and ammonia addition in the latter portion of the run has been found to be even more beneficial than in the first portion. In the preferred practice of my invention, a moderate, relatively constant or increasing ammonia concentration is maintained throughout the run length of e.g. 2 to 12 months or more, continuously up to end-of-run temperatures of e.g. 650°–820° F., at which point the catalyst is preferably regenerated. This moderate ammonia concentration of e.g. 50–200 p.p.m. is in general insufficient to bring about any significant increase in octane value of the resulting overall gasoline product.

As noted above, ammonia precursors may be used in place of ammonia. Suitable precursors include for example lower aliphatic amines such as butylamine and heterocyclic nitrogen compounds such as pyridine, quinoline and the like. Normally it is preferred to employ ammonia or easily decomposed amines such as the aliphatic amines, all of which are herein referred to as "ammoniacal" nitrogen compounds.

Reference is now made to the attached FIGURE 1 for an illustrative description of the processes as applied in a specific hydrofining-hydrocracking system. An original nitrogen- and sulfur-containing feedstock such for example as a coker gas oil, catalytic cycle oil or the like, is brought in via line 2, mixed with recycle and fresh hydrogen in line 4 and passed via preheater 6 into a conventional catalytic hydrofiner R–1 containing one or more beds of hydrofining catalyst 8. Suitable hydrofining catalysts include for example the oxides and/or sulfides of molybdenum and/or tungsten, preferably composited with an iron group metal oxide and/or sulfide such as nickel or cobalt. Preferred hydrofining catalysts comprise sulfided composites of molybdenum oxide and nickel oxide supported on an adsorbent, relatively non-cracking carrier such as activated alumina, or any other difficultly reducible, refractory oxide having a Cat-A activity index below about 25. Preferred catalysts contain about 2–6 weight-percent nickel and 5–25 weight-percent molybdenum. Suitable hydrofining conditions are as follows:

HYDROFINING CONDITIONS

| | Broad Range | Preferred Range |
|---|---|---|
| Temp., °F | 550–850 | 650–800 |
| Pressure, p.s.i.g | 500–4,000 | 1,000–3,000 |
| LHSV | 0.4–10 | 1–5 |
| H₂/Oil Ratio, M.s.c.f./b | 3–15 | 4–10 |

The above conditions are suitably adjusted and correlated so as to reduce the organic nitrogen content of the feed to below about 50 p.p.m., preferably below 10 p.p.m., and concomitantly to effect substantial desulfurization. The effluent from the hydrofiner, especially where temperatures in excess of about 700° F. are employed, will be found to contain a substantially larger proportion of benzcoronenes than the original feed. Typical benzcoronene contents of the effluent range between about 3 and 50 p.p.m. for feedstocks which originally contained less than 1 p.p.m.

Total effluent from hydrofiner R–1 is withdrawn via line 10 and transferred to first-stage hydrocracker R–2, which contains one or more beds 12 of a suitable zeolite hydrocracking catalyst as described hereinafter. Since the feed to hydrocracker R–2 contains ammonia and hydrogen sulfide formed in hydrofiner R–1, relatively high hydrocracking temperatures are required to maintain the desired conversion. Since there is no recycle of unconverted oil to hydrocracker R–2, there is no opportunity for a buildup of benzcoronenes therein. However, in cases where the hydrofiner effluent contains more than about 20 p.p.m. of benzcoronenes, it is observed that the effluent from hydrocracker R–2 will contain a substantially reduced amount thereof, generally in the range of about 10–20 p.p.m. This reflects the inherent effect of the ammonia therein in reducing benzcoronene levels to what appears to be an equilibrium value which cannot be reached in the absence of ammonia. In general, suitable hydrocracking conditions in first-stage hydrocracker R–2 are the same as those set forth above for hydrofiner 8, such conditions being adjusted to give about 30–70 volume-percent conversion per pass to desired product, e.g. gasoline.

Effluent from hydrocracker R–2 is withdrawn via line 14, condensed in heat exchanger 16, blended in line 18 with condensed effluent from second-stage hydrocracker R–3, washed with water injected via line 20, and passed into high-pressure separator 22. From separator 22, washed recycle gas is taken off via line 24 for recycle to hydrofiner 8 and second-stage hydrocracker R–3, and spent wash water containing dissolved ammonia, ammonium sulfide and the like is withdrawn via line 26. In a preferred modification of the process, the amount of water injected via line 20 is controlled so as to leave in the recycle gas in line 24 sufficient ammonia to provide the desired concentration thereof in hydrocracker R–3. Liquid hydrocarbon condensate in separator 22 is flashed via line 28 into low-pressure separator 30, from which light $C_1-C_3$ flash gases are withdrawn via line 32. Low-pressure condensate in separator 30, comprising the total liquid product from both of the hydrocrackers, is then transferred via line 34 to fractionating column 36, from which desired products such as gasoline and jet fuel may be withdrawn via lines 38 and 40 respectively. The remaining bottoms fraction from column 36, comprising unconverted oil from both hydrocrackers, is then transferred via line 42 to line 44 where it mingles with recycle gas (containing if necessary added ammonia injected via line 46). The resulting mixture is then passed via preheater 48 into second-stage hydrocracker R–3, containing one or more beds 50 of zeolite hydrocracking catalyst described hereinafter. Suitable hydrocracking conditions for hydrocracker R–3 may vary within the following broad ranges:

SECOND-STAGE HYDROCRACKING CONDITIONS

| | Broad Range | Preferred Range |
|---|---|---|
| Temp., °F | 450–850 | 500–750 |
| Pressure, p.s.i.g | 500–4,000 | 1,000–3,000 |
| LHSV | 0.4–20 | 1–10 |
| H₂/Oil Ratio, M s.c.f./b | 3–15 | 4–10 |

A broad range of operating temperatures may be used in hydrocracker R–3 by virtue of the options available in respect to ammonia and hydrogen sulfide content of the feedstock and recycle gases, and the choice of desired product. If the major desired product from the second stage is a middle distillate material such as turbine fuel, it is preferred to operate substantially in the absence of hydrogen sulfide (less than about 50 p.p.m. of sulfur based on feed) in order to obtain a more non-aromatic product. For this purpose, low operating temperatures in the range of about 450°–690° F. are normally preferred, and it is under these conditions that the buildup of benzcoronenes has been found to be most troublesome. To overcome this problem without unduly increasing temperatures, it is desirable to utilize minimal ammonia concentrations of e.g. 20–200 p.p.m., resulting in temperature increases of only about 10–100° F.

Where gasoline is the major desired product from hydrocracker R–3, it is normally preferred to operate at relatively higher temperatures in the range of about 650–850° F., in the presence of at least about 50 p.p.m. of hydrogen sulfide based on feed. In this case, suitable ammonia concentrations may vary widely from about 20 up to 2000 p.p.m. or more.

Effluent from hydrocracker R–3 is withdrawn via line 52, cooled and at least partially condensed in heat exchanger 54, and passed via line 56 to line 18 where it mingles with effluent from hydrocracker R–2 as previously described. It is in heat exchanger 54 that the major problem is encountered of the "plating out" of condensed benzcoronenes on the heat exchange surfaces. In the past, when operating such system without added ammonia to hydrocracker R–3, frequent shutdowns were necessary to remove such deposits from the heat exchangers. A typical analysis of such removed material (by low-voltage, direct probe sampling, high resolution mass spectrometry) was reported as follows:

TABLE 1

| Compound Type | Z No. | Weight-Percent of Methyl Homologs | | | | | | Total |
| --- | --- | --- | --- | --- | --- | --- | --- | --- |
| | | Number of Methyl Groups | | | | | | |
| | | 0 | 1 | 2 | 3 | 4 | 5 | |
| Coronenes | −36 | 0.0 | 0.1 | 0.1 | 0.2 | 0.1 | 0.0 | 0.5 |
| Benzcoronenes | −42 | 1.1 | 6.3 | 6.9 | 3.2 | 0.7 | 0.2 | 18.4 |
| Naphbenzcoronenes | −44 | 0.1 | 1.1 | 2.4 | 1.3 | 0.3 | 0.0 | 5.2 |
| Dibenzcoronenes | −46 | 0.2 | 1.2 | 2.2 | 1.8 | 0.7 | 0.3 | 6.4 |
| Do | −48 | 0.2 | 0.6 | 0.3 | 1.2 | 0.4 | 0.1 | 3.8 |
| Ovalenes | −50 | 0.3 | 0.7 | 3.2 | 3.2 | 1.9 | 0.6 | 9.9 |
| Tribenzcoronenes | −52 | 9.5 | 13.5 | 10.6 | 4.5 | 1.3 | 0.4 | 39.8 |
| Do | −54 | 0.3 | 1.6 | 1.9 | 0.8 | 0.3 | 0.0 | 4.9 |
| Benzovalenes | −56 | 1.6 | 2.4 | 1.8 | 0.7 | 0.2 | 0.0 | 6.7 |
| Tetrabenzcoronenes | −58 | 3.8 | 0.1 | 0.1 | 0.2 | 0.2 | 0.0 | 4.4 |
| | | | | | | | | 100.0 |

DESCRIPTION OF HYDROCRACKING CATALYSTS

Operative catalysts for use herein comprise in general any crystalline zeolite cracking base upon which is deposited a minor proportion of a Group VIII metal hydrogenating component. The zeolite cracking bases are sometimes referred to in the art as molecular sieves, and are composed usually of silica, alumina and one or more exchangeable cations such as sodium, hydrogen, magnesium, calcium, rare earth metals, etc. They are further characterized by crystal pores of relatively uniform diameter between about 4 and 14 A. It is preferred to employ zeolites having a relatively high $SiO_2/Al_2O_3$ mole-ratio, between about 3 and 12, and even more preferably between about 4 and 8. Suitable zeolites found in nature include for example mordenite, stilbite, heulandite, ferrierite, dachiardite, chabazite, erionite, and faujasite. Suitable synthetic zeolites include for examples those of the B, X, Y and L crystal types, or synthetic forms of the natural zeolites noted above, e.g. synthetic mordenite. The preferred zeolites are those having crystal pore diameters between about 8–12 A., wherein the $SiO_2/Al_2O_3$ mole-ratio is about 10 microns along the major dimension. A prime example of a zeolite falling in this preferred group is synthetic Y molecular sieve.

The naturally occurring zeolites are normally found in a sodium form, an alkaline earth metal form, or mixed forms. The synthetic zeolites normally are prepared first in the sodium form. In any case, for use as a cracking base it is preferred that most or all of the original zeolitic monovalent metals be ion-exchanged out with a polyvalent metal, and/or with an amonium salt followed by heating to decompose the zeolitic ammonium ions, leaving in their place hydrogen ions and/or exchange sites which have actually been decationized by further removal of water:

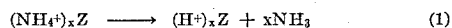
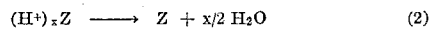

$$(NH_4^+)_xZ \longrightarrow (H^+)_xZ + xNH_3 \qquad (1)$$

$$(H^+)_xZ \longrightarrow Z + x/2\, H_2O \qquad (2)$$

Mixed polyvalent metal-hydrogen zeolites may be prepared by ion-exchanging first with an ammonium salt, then partially back-exchanging with a polyvalent metal salt and then calcining. In some cases, as in the case of synthetic mordenite, the hydrogen forms can be prepared by direct acid treatment of the alkali metal zeolites. Hydrogen or "decationized" Y zeolites of this nature are more particularly described in U.S. Patent No. 3,130,006.

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms, are designated herein as being "metal-cation-deficient." The preferred cracking bases are those which are at least about 10%, and preferably at least 20%, metal-cation-deficient, based on the initial ion-exchange capacity. A specifically desirable and stable class of zeolites are those wherein at least about 20% of the ion-exchange capacity is satisfied by hydrogen ions, and at least about 10% by polyvalent metal ions such as magnesium, calcium, zinc, rare earth metals, etc.

The essential active metals employed herein as hydrogenation components are those of Group VI–B and/or Group VIII, i.e., iron, cobalt, nickel, ruthenium, rhodium, palladium, osmium, iridium, platinum, chromium, molybdenum, tungsten, uranium, or mixtures thereof. The noble metals are preferred and particularly palladium and platinum. In addition to these metals, other promoters may also be employed in conjunction therewith, including the metals of Group VII–B, e.g. manganese.

The amount of hydrogenating metal in the catalyst can vary within wide ranges. Broadly speaking, any amount between about 0.05% and 20% by weight may be used. In the case of the noble metals, it is normally preferred to use about 0.05% to 2% by weight. The preferred method of adding the hydrogenating metal is by ion exchange. This is accomplished by digesting the zeolite, preferably in its ammonium form, with an aqueous solution of a suitable compound of the desired metal wherein the metal is present in a cationic form, as described for example in U.S. Patent No. 3,236,762.

Following addition of the hydrogenating metal, the resulting catalyst powder is then filtered off, dried, pelleted with added lubricants, binders or the like if desired, and calcined in air at temperatures of, e.g. 700–1,200° F. in order to activate the catalyst and decompose zeolitic ammonium ions. Alternatively, the zeolite component may first be pelleted, followed by addition of the hydrogenating component and activation by calcining.

The foregoing catalysts may be employed in undiluted form, or the powdered zeolite catalyst may be mixed and copelleted with other relatively less active catalysts, adjuvants, diluents or binders such as activated alumina, silica gel, coprecipitated silica-alumina cogels, magnesia, activated clays and the like in proportions ranging between about 5% and 90% by weight. These adjuvants may be employed as such, or they may contain a minor proportion of an added hydrogenating metal, e.g. a Group VI-B and/or Group VIII metal.

The following example is cited to illustrate the invention more specifically, but is not to be construed as limiting in scope.

EXAMPLE

A 120-day hydrocracking run was carried out in a two-stage hydrocracking unit similar to that illustrated in FIGURE 1. The feed was a blend of about 54 volume-percent of a straight-run vacuum gas oil and 46% of a light catalytic cracking cycle oil analyzing as follows:

|  | Straight Run Vac. Gas Oil | Light Catalytic Cycle Oil |
|---|---|---|
| Gravity, °API | 24.9 | 21.0 |
| ASTM Dist., °F.: | | |
| IBP | 480 | 456 |
| 10% | 570 | 511 |
| 50% | 700 | 560 |
| 90% | 830 | 633 |
| Max | 890 | 665 |
| Sulfur, Wt.-percent | 1.05 | 1.19 |
| Nitrogen, p.p.m.: | | |
| Total | 2,240 | 1,470 |
| Basic | 822 | 275 |
| Benzcoronenes, p.p.m | Nil | Nil |

Process conditions held relatively constant over the run were as follows:

|  | Hydrofiner, R-1 | Hydrocrackers | |
|---|---|---|---|
|  |  | R-2 | R-3 |
| Pressure, p.s.i.g | 1,750 | 1,700 | 1,700 |
| LHSV | 0.7-0.9 | 1.5-1.7 | 1.5-1.7 |
| Recycle Gas Rates, M s.c.f./b | 5 | 7 | 7 |

The hydrofining catalyst employed in the R-1 reactor was a presulfided composite of 3.1 weight-percent nickel oxide and 14.7 percent $MoO_3$ supported on a coprecipitated alumina-silica cogel containing 3.2 percent $SiO_2$. The hydrocracking catalyst employed in reactors R-1 and R-2 was a copelleted composite of 80 weight-percent of a magnesium-hydrogen Y zeolite (3 weight-percent MgO), and 20 weight-percent of an activated alumina binder, the composite containing 0.5 weight-percent of palladium added by ion-exchange.

Figure 2:
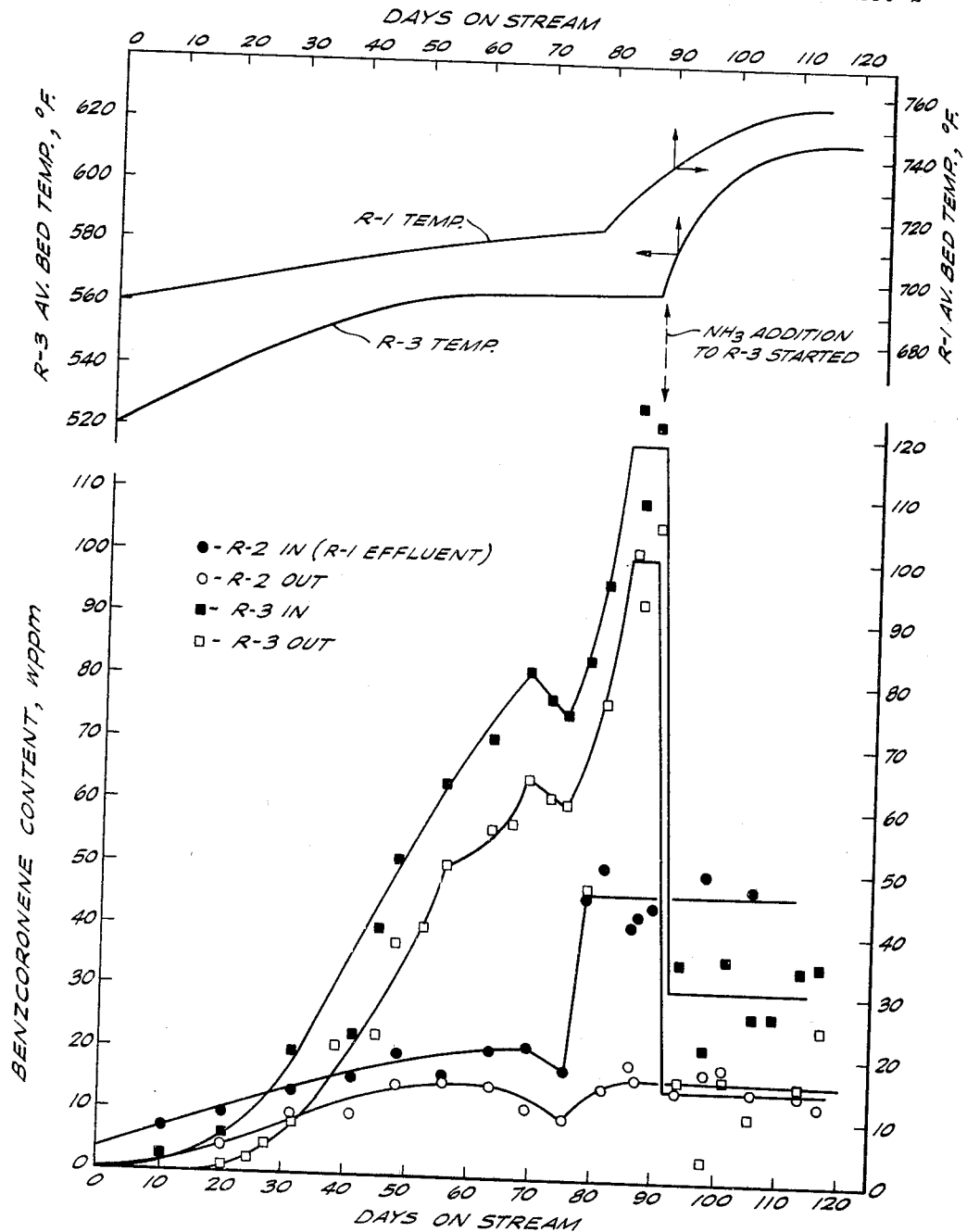
FIGURE 2 is a series of graphs depicting the benzcoronene content of various process streams in the process arrangement of FIGURE 1 over a specific 120 day run to be described in more detail in the example hereinafter presented. Also depicted are the significant average bed temperatures during the run, as related to ammonia addition and benzcoronene content of the process streams.

Throughout the run, the various reactor effluents were sampled and analyzed for benzcoronenes by chromatographic adsorption of the respective samples on activated alumina, followed by elution with methylene chloride and ultraviolet absorption analysis of the eluents at 4120 A., the benzcoronene content being given as:

$$\text{P.p.m. benzcoronenes} = A_{4120}/W$$

where W is the weight of the sample and $A_{4120}$ is the absorbance of the fraction at 4120 A. The resulting data points are plotted in lower portion of FIGURE 2. The upper graphs in FIGURE 2 represent the smoothed average bed temperature histories of reactors R-1 and R-3, the significance of which is as follows:

In hydrofiner R-1, temperatures were gradually increased from 690° to 716° F. over the first 75 days, to maintain about 3 p.p.m. of basic organic nitrogen in the reactor effluent. During this period it will be noted that the benzcoronene content of the R-1 effluent increased from about 7 p.p.m. to about 21 p.p.m. At this point R-1 temperatures were raised at a more rapid rate over the next 30 days, from 716° to about 758° F., in order to reduce the basic nitrogen content of the effluent to below 1 p.p.m. This increase hydrofining severity resulted in a substantially immediate rise in the effluent benzcoronene content to about 40-50 p.p.m. However, the effluent from the R-2 reactor, which was operating at approximately the same temperature as R-1, continued throughout this period to show a benzcoronene content of about 10-20 p.p.m., indicating that the zeolite catalyst can convert benzoronenes in the presence of ammonia (from the hydrofiner), down to this apparently equilibrium value.

During the first 88 days of the run, the R-3 reactor was operated in the absence of ammonia at temperatures increasing from about 520° to 566° F. (to maintain a constant conversion per pass of about 60 volume-percent to $C_4+$ gasoline) and with total recycle of 400° F. + bottoms from column 36 thereto. Due to this total recycle, and the absence of ammonia, it will be noted that the benzcoronene conent of the feed to R-3 built up to about 120 p.p.m., which was reduced to only about 100 p.p.m. in the effluent therefrom. It is thus apparent that the zeolite catalyst is relatively ineffective for converting benzcoronenes in the absence of ammonia.

At this point, the amount of wash water injected via line 20 was reduced sufficiently to permit about 50 p.p.m. of ammonia (based on total R-3 feed) to pass into the R-3 reactor via the recycle gas stream. R-3 temperatures were concomitantly increased to about 615° F. over the benzcoronenes in the presence of ammonia (from the hylevel. The dramatic effect of ammonia addition on benzcoronene content of the R-3 influent and effluent is readily apparent. Within two days the influent content dropped to about 25-35 p.p.m., while the effluent level dropped to the same equilibrium value of about 10-20 p.p.m. which was achieved in the R-2 reactor.

The invention is not to be construed as limited to the two-stage hydrocracking process described above, but is broadly applicable to any hydrocracking process, or stage thereof, wherein (1) a zeolite catalyst of the nature described is employed, (2) a feed is employed which contains benzcoronenes, and (3) a sufficient recycle of unconverted oil is maintained to bring about a buildup of benzcoronenes in the system under normal conditions. The process is particularly applicable to conventional processes involving separate hydrofining of the feed followed by hydrocracking of the ammonia-free effluent.

Additional modifications and improvements utilizing the discoveries of the present invention can readily be anticipated by those skilled in the art from the foregoing disclosure, and such modifications and improvements are intended to be included within the scope and purview of the invention as defined in the following claims:

I claim:

1. In a catalytic hydrocracking process wherein a mineral oil feedstock substantially free of organic nitrogen, but containing dissolved benzcoronenes, is subjected to hydrocracking with added hydrogen over a Group VIII metal-promoted crystalline zeolite hydrocracking catalyst at elevated temperatures and pressures sufficient to give a substantial conversion to lower boiling products, and wherein sufficient of the resulting unconverted oil is recycled to the hydrocracking zone to cause, in the absence of ammonia, a build-up in the system of benzcoronenes to a concentration exceeding the limits of their solubility in the condensed liquid product, the improved method for reducing said benzcoronene concentration to a substantially lower level, which comprises adding a nitrogen compound to the hydrocracking zone to maintain therein a sufficient concentration of ammonia, not exceeding about 200 p.p.m. by weight of feed during any portion of the run, to bring about an increased rate of conversion of benzcoronenes with a resultant decrease in the concentration of benzcoronenes in the system to a level not exceeding said solubility limits.

2. A process as defined in claim 1 wherein the concentration of ammonia maintained in said hydrocracking zone is insufficient to effect any substantial increase in the octane number of the $C_5+$ gasoline produced therein.

3. A process as defined in claim 2 wherein said concentration of ammonia is between about 10 and 200 p.p.m. by weight of feed.

4. A process as defined in claim 1 wherein said hydrocracking catalyst is a group VIII noble metal-promoted, hydrogen zeolite of the Y crystal type.

5. A process as defined in claim 1 wherein said hydrocracking catalyst is a Group VIII noble metal-promoted, hydrogen zeolite of the Y crystal type composited with an amorphous oxide gel component which also contains a Group VIII noble metal.

6. A process as defined in claim 1 wherein said hydrocracking is carried out at temperatures of about 450° to 690° F. in the presence of less than about 50 p.p.m. of sulfur, based on feed, to produce a predominantly turbine fuel product.

7. In a catalytic hydrocracking process wherein a mineral oil feedstock substantially free of organic nitrogen, but containing dissolved benzcoronenes, is subjected to hydrocracking with added hydrogen over a Group VIII metal-promoted crystalline zeolite hydrocracking catalyst at elevated temperatures and pressures sufficient to give a substantial conversion to lower boiling products, and wherein said hydrocracking is continued with incremental temperature increases for a total run length of at least about 2 months terminating in an end-of-run temperature between about 650° and 820° F., during which period a sufficient recycle of unconverted oil to the hydrocracking zone is maintained to cause, in the absence of ammonia, a buildup in the system of benzcoronenes to a concentration exceeding the limits of their solubility in the condensed liquid product, the improved method for reducing said benzcoronene concentration to a substantially lower level, which comprises adding a nitrogen compound to the hydrocracking zone to maintain therein throughout said run length a sufficient concentration of ammonia, between about 10 and 200 p.p.m. by weight of feed, to bring about an increased rate of conversion of benzcoronenes with a resultant decrease in the concentration of benzcoronenes in the system to a level not exceeding said solubility limits.

8. A process as defined in claim 7 wherein the concentration of ammonia is maintained in said hydrocracking zone is insufficient to effect any substantial increase in the octane number of the $C_5+$ gasoline produced therein.

9. A process as defined in claim 7 wherein said hydrocracking catalyst is a Group VIII noble metal-promoted, hydrogen zeolite of the Y crystal type.

10. A process as defined in claim 7 wherein said hydrocracking catalyst is a Group VIII noble metal-promoted, hydrogen zeolite of the Y crystal type composited with an amorphous oxide gel component which also contains a Group VIII noble metal.

References Cited
UNITED STATES PATENTS
3,215,013   10/1965   Arey  ---------------- 208—111

DELBERT E. GANTZ, Primary Examiner

ABRAHAM RIMANS, Assistant Examiner

U.S. Cl. X.R.

208—110